United States Patent Office 3,451,990
Patented June 24, 1969

3,451,990
RECOVERY OF VEGETABLE OILS AND PROTEINS
FROM EMULSIONS BY WET MILLING
Pedro Solé, Jr., Guatemala, Guatemala, assignor to Instituto Centroamericano de Investigacion y Technologia Industrial, Guatemala, Guatemala
No Drawing. Filed Nov. 16, 1965, Ser. No. 508,163
Int. Cl. A23j 1/14; C11b 1/00; A23d 5/00
U.S. Cl. 260—123.5          4 Claims

ABSTRACT OF THE DISCLOSURE

A process for the separation of vegetable oils from bearing vegetable matter which comprises milling the vegetable matter in water, held at a temperature sufficient to melt the oil, separating the fiber from the oil-in-water emulsion induced by inclusion by certain proteinaceous matter and, thereafter, recovering the oil by evaporating water from the emulsion.

---

The present invention is directed to an improved process for the recovery of vegetable oils.

Vegetable oils are commercially recovered from oil bearing matter either by mechanical pressing or by solvent extraction. Several methods have been proposed for the extraction of oils from wet vegetable matter, whereby water is added to form an emulsion with the oil. The emulsion is subsequently broken and the oil recovered. It is known that it is possible to mill, for example, coconut meat containing 45–50% moisture and form a water slurry to obtain, after filtering through 100 mesh wire cloth, a liquor (emulsion) that contains close to 90% of the oil originally present in the wet meat. Several methods have been proposed for the separation of the oil from the emulsion, among them, gravity separation, centrifugation, pH control, etc. None of these methods have proven entirely satisfactory, for example, even at pilot plant scale, breaking the emulsion requires a length process that yields good quality oil only if carried out carefully and with repetitive centrifugations. On an industrial scale, this would result in high investment and processing costs. Consequently, wet milling processes have not been able to compete with the conventional copra pressing processes.

It is an object of this invention to provide an improved process for obtaining oil from vegetable matter. It is a further object of this invention to provide an economical and efficient process to recover high quality coconut oil from coconut vegetable matter. Other objects and advantages of the invention will in part be obvious and will in part become apparent from the specification.

The present invention provides a process for obtaining oil from oil-bearing vegetable matter by wet milling the vegetable matter to form an emulsion of the oil and water. The oil is then recovered by evaporating the water from the emulsion. When evaporating the water from the emulsion in suitable equipment, it is preferable to concomitantly heat treat the protein contained in the emulsion and obtain oil- and protein-rich cake. Additional quantities of oil are recovered by pressing the cake.

The vegetable matter may be milled in conventional milling equipment such as rod mills, pebble mills, shredding mills, etc. The amount of water utilized will vary greatly, dependent upon such equipment and processing variables as the milling equipment, the particular vegetable matter. The amount of water may also be controlled to yield a liquid emulsion product having the most desirable characteristics for subsequent processing. It is generally preferred that the amount of water added in the wet milling operation should be at least five times the weight of the dry matter in the vegetable meat. The milling is carried out at a temperature above the melting point of the oil to be recovered, with a maximum milling temperature of about 80° C.

The water may be evaporated from the emulsion in conventional drying equipment. A preferred process utilizes a drum dryer. Another preferred process causes the evaporation of the water by simply pouring the vegetable oil or water emulsion into hot vegetable oil, thereby flashing off the water. The hot oil should be at a temperature of between 90° C. and 200° C.; and preferably above 100° C. The protein contained in the emulsion may be obtained from the hot vegetable oil as dry protein by filtration. The bulk of the resultant hot oil is recirculated, with a portion substantially equal to that added with the emulsion, bled off to the product stream.

The milling process of a particular oil-bearing vegetable matter may be controlled with the appropriate adddition of water to yield, after straining to remove gross fiber, a liquid containing in excess of 80% of the oil in the original vegetable matter, together with some protein and water. In a preferred embodiment of this invention, this liquid emulsion product is heated to a temperature between about 70° C. and 90° C. and preferably between 80° C. and 90° C., to facilitate separation into a heavier substantially all water phase, and a lighter phase containing substantially all of the desired oil. The heated liquid emulsion separates into the two phases upon standing. The lighter phase is then processed by evaporating the water to recover the oil.

The present invention is further illustrated in the following example in which all percentages are by weight. Ten parts of coconut meat, containing between 30% and 50% moisture content, were wet milled with 60 parts of water at a temperature between 40° C. and 80° C. The warm liquid product of the milling was strained to remove gross fiber. This liquid product was in the form of an emulsion containing between 80% and 90% of the oil in the coconut meat treated. The oil-bearing emulsion was then passed through a steam heated heat exchanger where its temperature was raised to between 80° C. and 90° C. to facilitate separation into two phases. The heat exchanger utilized is preferably one that has a minimum hold-up of material and a low residence time, i.e., a plate heat exchanger. The heated liquid emulsion is then passed to a decanter where a light phase may be continuously separated, or alternatively, may be passed to settling tanks from which the light phase is recovered after a settling time of between twelve and twenty-four hours. The resultant light phase is an emulsion containing between 3 and 4 parts of water per part of oil. This emulsion is then pumped to a rotary drum dryer which is heated to operating temperature by steam at 15 pounds per square inch. The water is evaporated, breaking the emulsion. The proteinaceous residue is scraped from the dryer by a knife edge. By the use of suitable discharge hoppers from the dryer, two separate fractions are obtained; one of them, predominantly a high quality coconut oil containing a small amount of protein and solid; and the other an oil soaked cake containing the major portion of the protein solids. The latter fraction may be recirculated to the drum dryer or processed in another equivalent dryer for removal of residual moisture and oil. The oil-rich cake is then passed to a conventional screw press where the oil is separated from the protein. This oil is usually of a lower grade. The protein cake is suitable for use in animal feed. The high quality oil fraction is processed to remove residual protein and other solids.

The processes of this invention permit the obtention of the vegetable oil from the vegetable matter with a minimum of equipment and processing time.

Although the foregoing example illustrates the obtention of coconut oil from coconut meat, the process is also applicable to the obtention of oil from other vegetable matter, preferably those containing between 20% and 50% water where the oil forms intractable emulsions with water, such as shea, conophor, avocado, zapote (*Lucuma mamosa*), chucte (*Persea schediana*), mango, raphia palm, *Trichilia emetica*, olive, rubber seed, etc.

As many embodiments of this invention may be made without departing from the spirit and scope thereof, it is to be understood that the invention includes all such modifications and variations as come within the scope of the appended claims.

What is claimed is:

1. A process for obtaining vegetable oil from oil-bearing raw coconut meat containing between 20% and 50%, moisture by weight, comprising wet milling said raw coconut meat with water in amount at least five times the dry weight of the solid content of said raw coconut meat at a temperature above the melting point of said oil, whereby oil is extracted from the raw coconut meat to form an emulsion of said oil and water which also contains solid proteinaceous matter, heating said emulsion to 80° C. to 90° C. to separate a heavy phase and a light oil in water phase emulsion, and recovering said oil by evaporating the water from said oil in water phase emulsion.

2. The process of claim 1 wherein, after the water is removed by evaporation, the remaining vegetable oil and protein are processed to separate the vegetable oil and a proteinaceous residue, and then pressing said proteinaceous residue to obtain a high protein cake and a lower grade vegetable oil.

3. The process of claim 2 wherein said water is evaporated from said oil in water phase emulsion in a drum dryer.

4. The process of claim 3 wherein said water is evaporated from said oil in water phase emulsion by adding said oil in water phase emulsion to hot vegetable oil at a temperature between about 90° C. and 200° C. and preferably above 100° C., whereby the water is flashed off.

References Cited

UNITED STATES PATENTS

| | | | |
|---|---|---|---|
| 1,374,879 | 4/1921 | Cookson | 99—125 |
| 1,903,172 | 3/1933 | Eilertsen et al. | 106—154 |
| 1,929,691 | 10/1933 | Hutteman | 99—125 |
| 2,079,030 | 5/1937 | Northcutt | 99—125 |
| 2,101,371 | 12/1937 | Lava | 87—6 |
| 2,147,751 | 2/1939 | Northcutt | 99—125 |
| 2,422,893 | 6/1947 | Forkner | 99—125 |
| 2,583,022 | 1/1952 | Sodergreen | 260—412.2 |
| 2,583,697 | 1/1952 | Hendry et al. | 99—140 |
| 2,629,722 | 2/1953 | Dunning | 260—412.4 |
| 2,712,250 | 7/1955 | Lopez-Irizarry | 99—125 |
| 2,726,155 | 12/1955 | King et al. | 99—2 |
| 2,742,487 | 4/1956 | Robledano | 260—412 |
| 2,762,820 | 9/1956 | Sugarman | 260—412.3 |
| 2,981,627 | 4/1961 | Wen | 99—125 |
| 3,069,442 | 12/1962 | Hiller | 260—412.2 |
| 3,083,365 | 3/1963 | Roxas | 260—412.2 |
| 3,106,571 | 10/1963 | Birosel | 260—412.2 |

FOREIGN PATENTS

| | | |
|---|---|---|
| 1,083,964 | 9/1956 | Germany. |
| 3 | 12/1948 | Philippines. |
| 39 | 12/1949 | Philippines. |

OTHER REFERENCES

Chem. Abstracts, vol. 62, 1965, 9701 c–f, Food Techniques, October 1964.

WILLIAM H. SHORT, *Primary Examiner.*

HOWARD SCHAIN, *Assistant Examiner.*

U.S. Cl. X.R.

99—17, 125; 260—112, 146, 146.7, 227, 412.2, 412.4, 412.6, 412.8